(12) United States Patent
Gao et al.

(10) Patent No.: US 9,584,332 B2
(45) Date of Patent: Feb. 28, 2017

(54) MESSAGE PROCESSING METHOD AND DEVICE

(71) Applicant: ZTE CORPORATION, Shenzhen, Guangdong Province (CN)

(72) Inventors: Jiwei Gao, Shenzhen (CN); Wei Huang, Shenzhen (CN)

(73) Assignees: ZTE Corporation, Shenzhen, Guangdong Province (CN); ZTE Microelectronics Technology Co., Ltd., Shenzhen, Guangdong Province (CN)

(*) Notice: Subject to any disclaimer, the term of this patent is extended or adjusted under 35 U.S.C. 154(b) by 0 days.

(21) Appl. No.: 14/395,831

(22) PCT Filed: Aug. 19, 2013

(86) PCT No.: PCT/CN2013/081778
§ 371 (c)(1),
(2) Date: Oct. 21, 2014

(87) PCT Pub. No.: WO2013/189364
PCT Pub. Date: Dec. 27, 2013

(65) Prior Publication Data
US 2015/0304124 A1    Oct. 22, 2015

(30) Foreign Application Priority Data
Oct. 12, 2012  (CN) .......................... 2012 1 0387704

(51) Int. Cl.
*H04L 12/18*    (2006.01)
*H04L 12/801*   (2013.01)
*H04L 29/08*    (2006.01)

(52) U.S. Cl.
CPC .......... *H04L 12/1881* (2013.01); *H04L 47/15* (2013.01); *H04L 67/2852* (2013.01)

(58) Field of Classification Search
CPC .. H04L 47/15; H04L 67/2852; H04L 12/1881
See application file for complete search history.

(56) References Cited

U.S. PATENT DOCUMENTS 6,918,005 B1    7/2005  Merchant et al.
7,548,848 B1    6/2009  Deb et al.
(Continued)

FOREIGN PATENT DOCUMENTS

CN    101150490 A    3/2008
CN    101729407 A    6/2010
(Continued)

OTHER PUBLICATIONS

Split-Ordered Lists—Lock-free Resizable Hash Tables; Ori Shalev et al. Twenty-second Annual ACM Symposium on Principles of Distributed Computing, pp. 102-111, Boston, Massachusetts (2003).

*Primary Examiner* — Jae Y Lee
(74) *Attorney, Agent, or Firm* — Ling Wu; Stephen Yang; Ling and Yang Intellectual Property

(57) ABSTRACT

A message processing method and device, the method comprises: allocating a node to an input message in a cache space for saving the message, and taking the location corresponding to the cache space as index information of a descriptor of the message; and extracting the descriptor information of the message; framing and saving the descriptor information and node information of the message in a node linked list. The abovementioned solution can achieve uniform memory of unicast and multicast messages, and the descriptor linked list corresponds to the packet entity caching resource, thereby significantly reducing the overheads for managing the unicast and multicast messages, so as to improve the node aggregation capability.

12 Claims, 6 Drawing Sheets

(56) References Cited

U.S. PATENT DOCUMENTS

| | | |
|---|---|---|
| 8,223,788 B1 | 7/2012 | Perelstain et al. |
| 2003/0223458 A1 | 12/2003 | Mathews et al. |
| 2004/0114616 A1 | 6/2004 | Wang |
| 2005/0036502 A1 | 2/2005 | Blanc et al. |
| 2006/0187949 A1* | 8/2006 | Seshan ............... H04L 12/5693 370/412 |

FOREIGN PATENT DOCUMENTS

| | | |
|---|---|---|
| CN | 101835102 A | 9/2010 |
| JP | 2005323231 A | 11/2005 |

\* cited by examiner

| Queue 1 | | Head pointer | | | | Tail pointer | |
|---|---|---|---|---|---|---|---|
| | | HU | HM | HPOS | TU | TM | TPOS |
| | B00 | 00 | | 0 | 00 | | 0 |
| | B10 | 00 | | 0 | 10 | | 0 |
| | B20 | 00 | | 0 | 20 | | 0 |
| | B31 | 00 | | 0 | 20 | 31 | 1 |
| Packet enqueue | B32 | 00 | | 0 | 20 | 32 | 1 |
| | B40 | 00 | | 0 | 40 | 32 | 0 |
| Consecutive multicast packets come, and insert an empty node block: The first block of said multicast packet | B51 | 00 | | 0 | 40 | 51 | 1 |
| | B71 | 00 | | 0 | 71 | 51 | 0 |
| | B82 | 00 | | 0 | 71 | 82 | 1 |
| The second block of said multicast packet | B83 | 00 | | 0 | 71 | 83 | 1 |
| | B84 | 00 | | 0 | 71 | 84 | 1 |
| The third block of said multicast packet | B90 | 00 | | 0 | 90 | 84 | 0 |

| | | HU | HM | HPOS | | | | | | | | | TU | TM | TPOS |
|---|---|---|---|---|---|---|---|---|---|---|---|---|---|---|---|
| | B00 | | | | | | | | | | | | | | |
| | B10 | 10 | | 0 | Ipt | Js | B_len | eopu | | | | | 90 | 84 | 0 |
| | B20 | 20 | | 0 | Ipt | Js | B_len | eopu | | | | | 90 | 84 | 0 |
| | B31 | 40 | 31 | 1 | Ipt | Js | B_len | eopu | Ids | B_len | Desc | eopm | 90 | 84 | 0 |
| | B32 | 40 | 32 | 1 | Ipt | Js | B_len | eopu | Ids | B_len | Desc | eopm | 90 | 84 | 0 |
| Packet dequeue | B40 | 40 | 32 | 0 | Ipt | Js | B_len | eopu | Ids | B_len | Desc | eopm | 90 | 84 | 0 |
| | B51 | 71 | 51 | 1 | Ipt | Js | B_len | eopu | Ids | B_len | Desc | eopm | 90 | 84 | 0 |
| | B71 | 71 | 51 | 0 | Ipt | Js | B_len | eopu | Ids | B_len | Desc | eopm | 90 | 84 | 0 |
| | B82 | 90 | 82 | 1 | Ipt | Js | B_len | eopu | Ids | B_len | Desc | eopm | 90 | 84 | 0 |
| | B83 | 90 | 83 | 1 | Ipt | Js | B_len | eopu | Ids | B_len | Desc | eopm | 90 | 84 | 0 |
| | B84 | 90 | 84 | 1 | Ipt | Js | B_len | eopu | Ids | B_len | Desc | eopm | 90 | 84 | 0 |
| | B90 | 90 | 84 | 0 | Ipt | Js | B_len | eopu | Ids | B_len | Desc | eopm | 90 | 84 | 0 |

FIG. 7

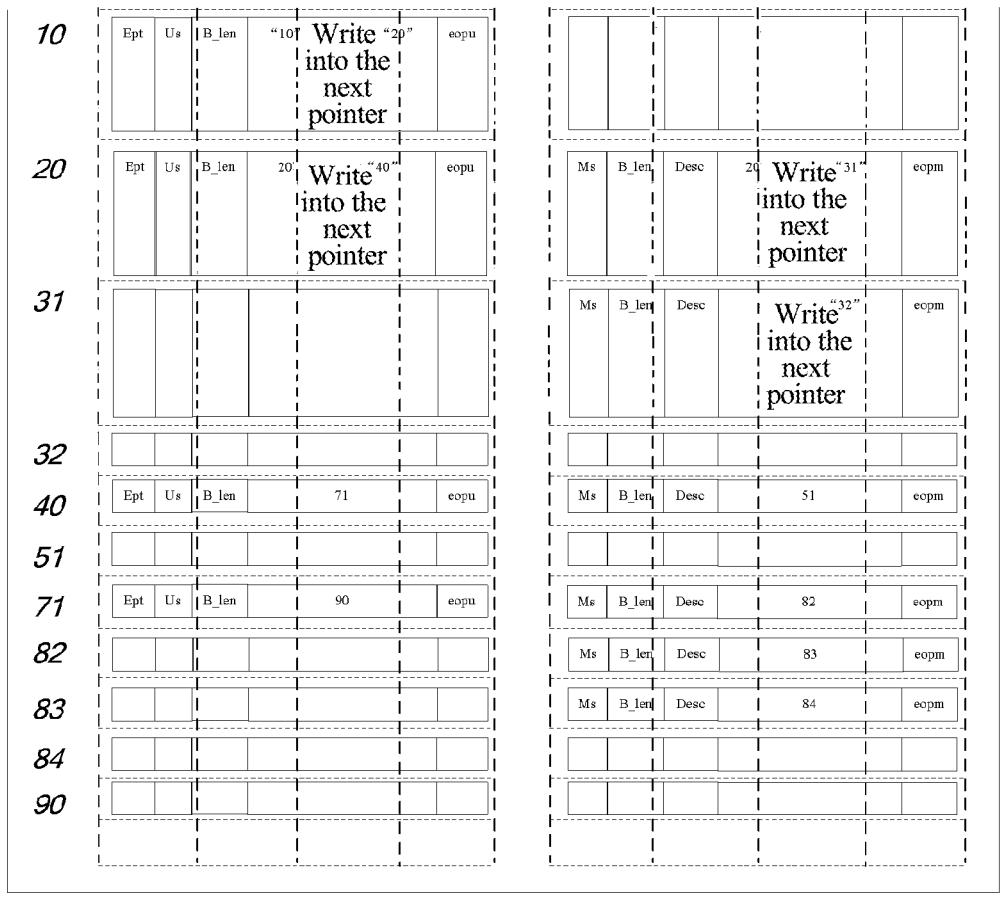
FIG. 8 (continue)

MESSAGE PROCESSING METHOD AND DEVICE

TECHNICAL FIELD

The present document relates to the field of communication technologies, and more particularly, to a message processing method and device.

BACKGROUND OF THE INVENTION

In the current packet-switched network, due to the service processing needs, the system first needs to identify unicast and multicast attributes of the messages, then internally replicate the multicast messages, manage the unicast and multicast messages, schedule to dequeue the messages in accordance with the rules set by the users, and finally embody all the editing situations of the messages at the exit of the system. Before continuing the analysis, it is necessary to mention that in the variable-length packet-switched network, the packet fragmentation technique can effectively reduce the data delay and jitter and improve the cache utilization, and it is an important mechanism for caching and managing the messages in the current packet-switched network processing device. Its implementation mechanism is to divide the entire cache space into n memory units in accordance with a fixed size, whenever there is a message input, allocate a cache space according to the size of the message, and for a message equal to or less than one memory unit, directly allocate one unit, and for a longer message, it may need to allocate multiple memory units, meanwhile it needs to record that so many memory units belong to the same message, and in design, generally a linked list is used to manage. Thus for the entire cache space, the linked list is used to allocate the cache space when there is packet input and to reclaim the cache space when there is packet output.

Correspondingly, for message output scheduling management, there is a mechanism-descriptor management corresponding to the cache management. Its role is to generate a descriptor for each message already saved in the cache, and said descriptor records the pointer of said message in the cache space. Corresponding to the cache space of the packet entity, the descriptor is saved in the node space, and also the linked list is used to manage. Each descriptor occupies one node, and is allocated with one node during the enqueue and the one node is saved in the corresponding queue according to the user-defined rules, and said node is reclaimed during the dequeue, meanwhile the descriptor is sent to the cache space to manage, and the pointer in said cache space is used to extract the packet entity.

In fact, we can analyze that, assuming the system only support the unicast message service, the memory space of the packet entity can one-by-one correspond to the node space of the descriptor, so that the two sets of management mechanisms can be merged into one set, but the current conflict is the treatment for multicast packets. Since multicast is to replicate the descriptor of the message several times and finally map them to different queues, one multicast message occupies multiple nodes, but there is only one packet entity, thus there is the procedure shown in FIG. 1. For a plurality of nodes for the same multicast message, all the pointers of their descriptors in the cache space point to the memory address of the packet linked list, so as to save and forward the multicast message. It can also be seen that there are two sets of management mechanisms in the prior art, the overheads and managements of the packet and queue of two sets of linked lists have large scale and complicated parts, which significantly increases the cost of maintenance and management.

SUMMARY OF THE INVENTION

The technical problem to be solved by the present document is to provide a message processing method and device, to achieve the unified memory of unicast and multicast messages, a descriptor linked list corresponds to a packet entity cache resource, significantly reducing overheads for managing unicast and multicast messages, so as to improve node aggregation capability.

To solve the abovementioned technical problem, the present document provides a message processing method, comprising:

allocating a node to an input message in a cache space, saving said message, and taking a location corresponding to said cache space as index information of a descriptor of said message;

extracting descriptor information of said message;

framing and saving said descriptor information and node information of said message in a node linked list.

Preferably, the abovementioned method further has the following feature: allocating a node to said input message in said cache space and saving said message, comprising:

applying for a node in a cached idle linked list, and maintaining a corresponding linked list pointer;

saving said message in an external memory unit in accordance with a cache address corresponding to said node.

Preferably, the abovementioned method further has the following feature: after applying for a node in said cached idle linked list, comprising:

enqueuing and saving said node, if adjacent nodes in the same queue have a multicast attribute, inserting an empty node between said adjacent nodes, the multicast pointer of the previous node pointing to the address of said empty node, and the multicast pointer of said empty node pointing to the next node.

Preferably, the abovementioned method further has the following feature: after saving said message into said external memory unit according to said cache address corresponding to said node, further comprising:

after receiving a dequeue command, obtaining a linked list pointer of said node according to said dequeue command, and reading data corresponding to said node according to a mapping relationship between said linked list pointer and said external memory unit.

Preferably, the abovementioned method further has the following feature: said descriptor information comprising one or more of the following information:

unicast information of said message, multicast information of said message, index information, message tail attribute of the current node, an effective number of bytes, and queue number.

To solve the abovementioned problem, the present document further provides a message processing device, comprising:

a first module, configured to: allocate a node to an input message in a cache space, save said message, and take a location corresponding to said cache space as an index information of a descriptor of said message;

a second module, configured to: extract descriptor information of said message;

a third module, configured to: frame and save said descriptor information and node information of said message in a node linked list.

Preferably, the abovementioned device further has the following feature: said first module comprising:

a first unit, configured to: apply for a node in a cached idle linked list and maintain a corresponding linked list pointer;

a second unit, configured to: save said message in an external memory unit according to a cache address corresponding to said node.

Preferably, said device further has the following feature:

said first unit is configured to: after applying for a node in said cached idle linked list, enqueue and save said node, if adjacent nodes in the same queue have multicast attribute, insert an empty node between said adjacent nodes, the multicast pointer of the previous node points to the address of said empty node, and the multicast pointer of said empty node points to the next node.

Preferably, the abovementioned device further has the following feature: said device further comprising:

a fourth module, configured to: after receiving a dequeue command, obtain the linked list pointer of said node according to said dequeue command, according to a mapping relationship between said linked list pointer and said external memory unit, read the data corresponding to said node.

Preferably, the abovementioned device further has the following feature: said descriptor information comprises one or more of:

unicast information of said message, multicast information of said message, index information, message tail attribute of the current node, the effective number of bytes, and the queue number.

In summary, the embodiment of the present document provides a message processing method and device, which does not need to use two separate management mechanisms because of the replication of multicast node, and manages and maintains the unicast and multicast attributes and the corresponding linked list pointer in a single node information, so as to ensure that the queue nodes and the cache space units can be one to one corresponding with each other, the entire management only needs to maintain one set of linked list allocation and reclaimant mechanism. In a scenario that there are unpredictable unicast and multicast messages at the system input side, use one node to separately maintain the descriptor linked list from the unicast and multicast two dimensions, so as to achieve unified memory of unicast and multicast messages, and the descriptor linked list corresponds to the packet entity cache resource, significantly reducing the overheads for managing said unicast and multicast messages and having better versatility.

BRIEF DESCRIPTION OF THE DRAWINGS

FIG. 7 is a schematic diagram of a queue linked list's pointer operation in accordance with an embodiment of the present document;

PREFERRED EMBODIMENTS OF THE PRESENT INVENTION

Hereinafter with combination to the accompanying drawings, the embodiments of the present document will be described in detail. It should be noted that, in the case of no conflict, the embodiments and features in the embodiments of the present application may be arbitrarily combined with each other.

In the current packet-switched network device, in order to support the unified processing of the unicast and multicast messages, a commonly used method is to divide into two parts: packet entity management and descriptor management, said packet entity management is used to allocate and reclaim cache spaces with a fixed size, save the message entity, maintain the complete information of said message, and so on. The descriptor management is used for, after unpacking a multicast packet, unified entering into the queue with the unicast packets, allocating, de-queuing schedule and reclaiming the node space, and finally instructing said packet entity management to output said message.

Although these two sets of processing mechanisms can correctly to perform unified management of the unicast and multicast messages, it brings the system processing complexity, large implementation overheads, and other issues. According to the previous discussion, the system uses two sets of management mechanisms for a compatible design of processing both the unicast and multicast packets, therefore, whether it is possible to come up with a method for using one management mechanism to be compatible with the abovementioned design requirements, just plain analysis does not work, because we will find that if a multicast packet enters into a different queue, it has different next pointer, if simply one-by-one corresponding said packet entity space to said descriptor space, the implementation overhead is not able to bear. However, if the packet entity space and said descriptor space can be node aggregated and the memory information of the original two spaces can be integrated, it can use one set of management mechanism, which is not only simple in process, but also more common in structure.

The present document designs a message processing method to improve the node aggregation capability, wherein, firstly allocate a cache space to the input message to save the message, then take the location corresponding to said cache space as the descriptor's index information to participate into the enqueue of said message, and during the enqueue process, aggregate said nodes according to attributes such as the unicast and multicast attributes of the message, message tail sign, and the connection information of the queue members, and aggregate the memory space and the descriptor space of said message into one set of management information, corresponding to one visit space, thus using one set of node maintenance mechanism with high aggregation capability to manage the unicast and multicast messages.

Figure 1:
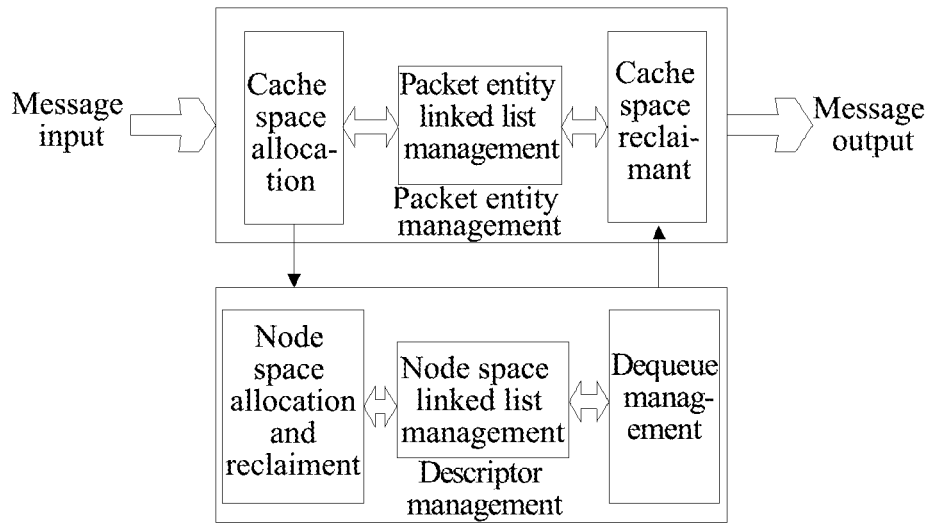
FIG. 1 is a structural diagram of a commonly used unicast and multicast unified cache.
Figure 2:
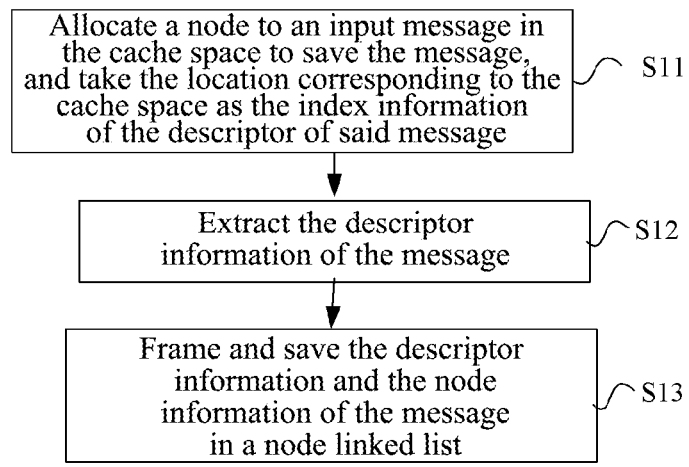
FIG. 2 a flow chart of a message processing method in accordance with an embodiment of the present document.

FIG. 2 is a flow chart of a message processing method in accordance with an embodiment of the present document, as shown in FIG. 2, the method of the present embodiment comprises:

S11, allocate a node to an input message in the cache space to save said message, and take the location corresponding to said cache space as the index information of the descriptor of said message;

S12, extract the descriptor information of said message;

S13, frame and save the descriptor information and the node information of said message in a node linked list.

Wherein, allocating a node to said input message in said cache space to save said message in step S11 comprises:

applying for a node in said cached idle linked list and maintaining the corresponding linked list pointer;

saving said message in an external memory unit in accordance with the cache address corresponding to said node.

Wherein after applying for a node in said cached idle linked list, the method comprises:

enqueuing and saving said node, if the adjacent nodes in the same queue have multicast attribute, insert an empty node between said adjacent nodes, the multicast pointer of the previous node points to the address of said empty node, and the multicast pointer of said empty node points to the next node.

Wherein, after saving said message into said external memory unit according to the cache address corresponding to said node, the method further comprises:

after receiving a dequeue command, obtaining a linked list pointer of said node according to said dequeue command, according to the mapping relationship between said linked list pointer and said external memory unit, reading the data corresponding to said node.

Figure 3:
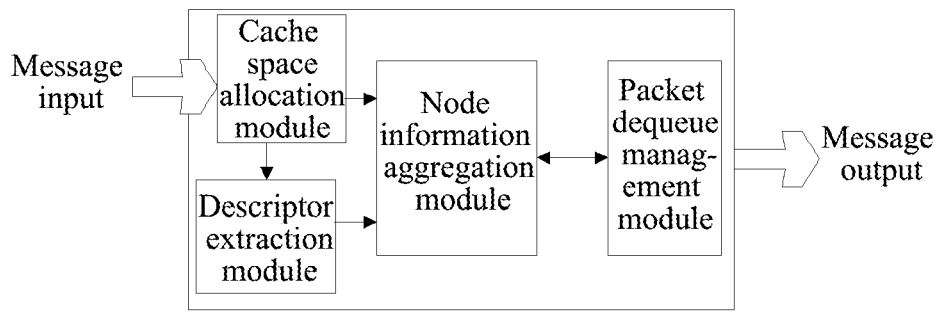
FIG. 3 is a schematic diagram of a message processing device in accordance with an embodiment of the present document.

FIG. 3 is a schematic diagram of a message processing device in accordance with an embodiment of the present document, as shown in FIG. 3, the device of the present embodiment comprises:

a cache space allocation module (equivalent to the first module), used to allocate a node to the input message in said cache space to save said message, take the location corresponding to said cache space as the index information of the descriptor of said message;

a descriptor extraction module (equivalent to the second module), used to extract the descriptor information of said message;

a node information aggregation module (equivalent to the third module), used to frame and save the descriptor information and the node information of said message in a node linked list.

Wherein said first module comprises:

a first unit, used to apply for a node in the cached idle linked list and maintain the corresponding linked list pointer;

a second unit, used to save said message in the external memory unit according to the cache address corresponding to said node.

Wherein, after applying for a node in said cached idle linked list, said first unit is further used to enqueue and save said node, if the adjacent nodes in the same queue have multicast attribute, insert an empty node between the adjacent nodes, the multicast pointer of the previous node points to the address of said empty node, and the multicast pointer of said empty node points to the next node.

In a preferred embodiment, it may further comprise:

a packet dequeue management module (equivalent to the fourth module), used to after receiving a dequeue command, obtain a linked list pointer of said node according said dequeue command, and read the data corresponding to said node according to the mapping relationship between said linked list pointer and said external memory unit.

Wherein, the descriptor information comprises one or more of the following information:

unicast information of said message, multicast information of said message, index information, message tail attribute of the current node, the effective number of bytes, and the queue number.

The message processing device according to the embodiment of the present document mainly comprises the following four parts: a cache space allocation module, a descriptor extraction module, a node information aggregation module and a packet dequeue management module. These four parts together complete the packet storage, parsing, tagging and extraction and so on, thus ensuring that a very simplified and streamlined process is used to process the unicast and multicast messages. Wherein, said cache space allocation module is responsible for, when a message inputs, first applying for a node in the cached idle linked list, then maintaining a corresponding linked list pointer, meanwhile saving said message into the external memory unit according to the cache address corresponding to said node. After each saving operation of an external memory unit corresponding to one node, sending the node index of said external memory unit to said descriptor extraction module, meanwhile carrying the descriptor information such as said message's unicast and multicast information represented by said external memory unit, the message tail attribute of the current node, the effective number of bytes, and the queue number, and for multiple nodes of a single message, it needs to ensure that the unicast information and multicast information are consistent.

Said descriptor extraction module is responsible for receiving the descriptor information sent from said cache space allocation module to complete saving the information of the corresponding node. When the received allocating node information is valid, assembling the descriptor information such as the aligned queue number and the message attribute in accordance with the predetermined bit field, and driving the valid signal to the information aggregation module of said node.

The node information aggregation module is responsible for processing the node aggregation linked list, comprising the en-queue and de-queue process of said node. When receiving a information valid indication from said descriptor extraction module, sampling and saving the aligned descriptor, meanwhile extracting the allocated node information of said message in the cache space, and then packing, framing and saving the abovementioned information in the node en-queue fifo (first in first out). Corresponding to en-queue and saving node, the de-queue command come from the packet de-queue management module is saved in the node de-queue fifo. Both the enqueue and de-queue fifos being scheduled under the polling mechanism with fixed time slot, reading the fifo, parsing the command, extracting the queue number and descriptor, maintaining the head and tail pointers, performing the read and write protection of the en-queue and de-queue operations, and so on, and finally maintaining the member information of the linked list node space. Wherein, the enhancement of the node aggregation ability is mainly reflected in the maintenance of the queue linked list pointer and the node information, maintaining the linked list pointer and the unicast and multicast link information of said node by analyzing the attributes of the descriptor, and significantly compressing and simplifying the original packet linked list and node linked list.

The packet de-queue management module is responsible for dequeue scheduling in accordance with the user rules, controlling the node de-queue in each queue and controlling the data output corresponding to said node. In a de-queue request operation, said packet de-queue management module sends a de-queue enabled signal and queue number to the node information aggregation module, after selecting and processing the operation command, ultimately receives the node de-packet pointer information sent by said node aggregation module. According to the mapping relationship between the node pointer and the data memory unit, drive the external memory_controller to read and output the data corresponding to said node to complete saving and forwarding the data.

The cache management method of the present embodiment employs the way that the nodes and the memory units one by one correspond with each other, for a unicast packet or a unicast node, this processing method is easy to understand, just allocate the corresponding node in accordance with the memory unit allocation method. But if it needs to support the unicast and multicast unified management, it needs to consider the other three cases: it is a multicast node after a unicast node, it is a multicast node after a multicast node, and it is a unicast node after a multicast node. If the node-based management can achieve these four combinations, it completes the unicast and multicast unified management, and its essence is to solve the issue of managing the linked list of the same multicast packet or multicast piece between the queues. Next, each of these cases will be described respectively.

Figure 4:
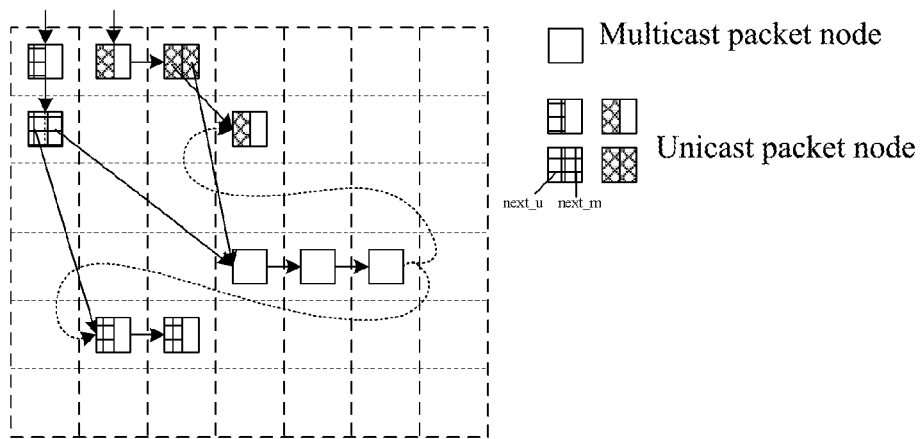
FIG. 4 is a schematic diagram of a unicast and multicast node aggregation operation in accordance with an embodiment of the present document.

Assuming take the x queue in FIG. 4 for example, the nodes occupied by the queue in FIG. 4 correspond to the cache spaces one by one, it uses the processing method that each node maintains the unicast link information and the multicast link information. The first two nodes in the queue are unicast nodes, for the first node, it only needs to maintain its unicast link information, including the next pointer, packet tail attribute, and so on. For the second node, its next node has multicast attribute, thus it first needs to maintain its multicast link information, until a complete multicast packet tail node is obtained, for all the multicast nodes between them, only maintain the multicast link information. Then go back to the bit field of the unicast link information of the second node to maintain the pointer information of the unicast node after the multicast packet in the queue. Therefore, for any unicast node, if its next node is a multicast node, maintain in its multicast information bit field, if the next node of the multicast packet tail is a unicast node, maintain in the unicast bit field where it maintains its multicast packet head. If said multicast packet has one copy in the queue y, such as the node identifier shown in FIG. 4, then similarly use the abovementioned method to maintain, the next_m of the nodes belonging to two queues are both pointing to the same one multicast packet head node, and the tail node of said multicast packet indicates the end of said multicast packet, and find the next nodes in respective queues through the next_u of the source node.

Figure 5:
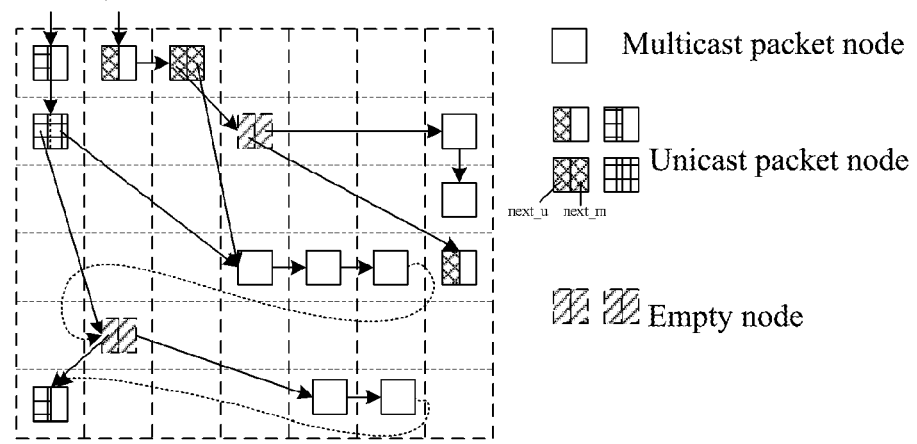
FIG. 5 is a schematic diagram of a multicast linked multicast node aggregation operation in accordance with an embodiment of the present document.

So if the situation is a little more complicated, it is still a multicast packet after the multicast packet, how to deal? First, we analyze the situation when two multicast packets are connected. We know from the previous analysis that after the link operation of one multicast packet, it needs to find the next pointer according to the information of the node pointing to its packet head. For the case currently to be discussed, if the next pointer remains a multicast node, it is bound to add a multicast bit field, and if there are several consecutive multicast packets, the node pointing to the first multicast packet head should add multiple multicast bit fields, if designed in this way, the memory overhead cannot bear and the utilization is very low, therefore, when there are two adjacent multicast packets in the same queue, it needs to insert an empty node, the schematic diagram of the specific operation is shown in FIG. 5. Compared with FIG. 4, it is a multicast packet rather than a unicast packet after the multicast packet in the queues x and y, then currently it needs to insert an empty node into each queue respectively, the next_u of the previous multicast packet points to the address of said empty node, namely the index of said empty node, and the multicast pointer next_m of said empty node is the next multicast packet, the unicast pointer next_u of said empty node is the next hop. If the next hop is unicast, then what the next_u points to is an actually existing unicast node address, if the next hop is still a multicast, then it still points to an empty node, the operation is as above described.

With the method according to the embodiment of the present document, the two sets of management mechanisms used in the original scheme are merged into one set, by improving the node aggregation capability, significantly simplify the handling process, reduce the resource overhead, and better adapt to a variety of situations that unicast and multicast share proportions of nodes in the system real-time operating process. After the node aggregation, the finest grain of the scheduled queue members changes from a packet to a node, which, for the packet-switched network in which the packet has variable-length, is very effective for reducing the jitter and improving the performance.

Figure 6:
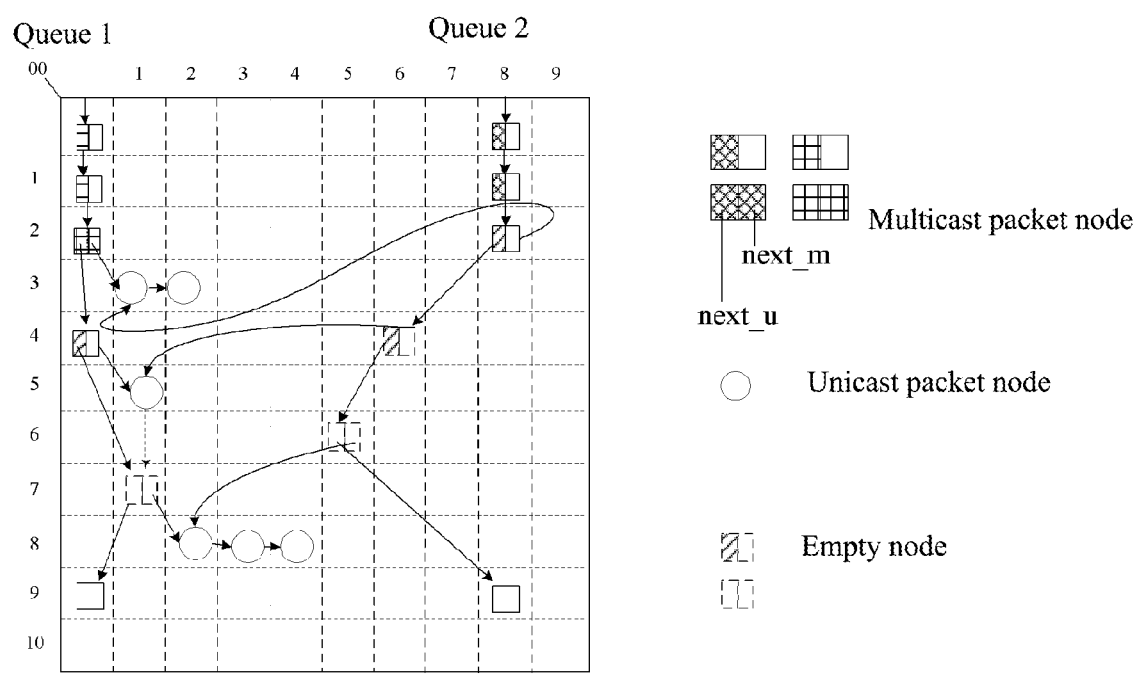
FIG. 6 is a schematic diagram of a various node aggregation operation in accordance with an embodiment of the present document.

In order to more clearly illustrate the technical solutions of the present document, in the following, with combination of FIG. 6, FIG. 7, FIG. 8, and specific embodiments, further describe but not intend to limit the present document Assuming that currently there is a memory area shown as the dotted grid in FIG. 6, use the node aggregation method to manage, and each node corresponds to one external memory address. The system in turn inputs and saves the unicast short packets in B00, B10, B20, and maps them to queue 1, and sequentially inputs and saves the unicast packets in B08, B18, B28 and maps them to queue 2. Then, input and save a multicast long packet in B31 and B32, and after said packet multicasts, map it to queue 1 and queue 2, and then input and save a unicast short packet in B40 and map it to queue 1, after that, input and save multicast short packet in B51 and map it to queue 1 and queue 2, due to the two consecutive multicast packets, the queue 2 at this time applies for an empty node B46 to maintain the node aggregation linked list. Then there comes a multicast long packet which is mapped to queue 1 and queue 2 respectively, the packet head occupies B82, at this time, the queues 1 and 2 require to apply for empty nodes B71 and B65 respectively, until later the unicast B90 is mapped to the queue 1, and B98 is mapped to the queue 2.

The abovementioned situations traverse all methods for interconnecting the unicast packets and multicast packets, in the following, by taking the queue 1 for example to illustrate the aggregation operation of the unicast and multicast information of each node in the queue and the queue head and tail pointer operations, said queue 2 has the same procedures. For the memory saving the linked list node information, it can select on-chip or off-chip according to the needs, and the difference is that the off-chip memory may need the byte mask operation due to limitations of bit-width and bandwidth.

Figure 8:
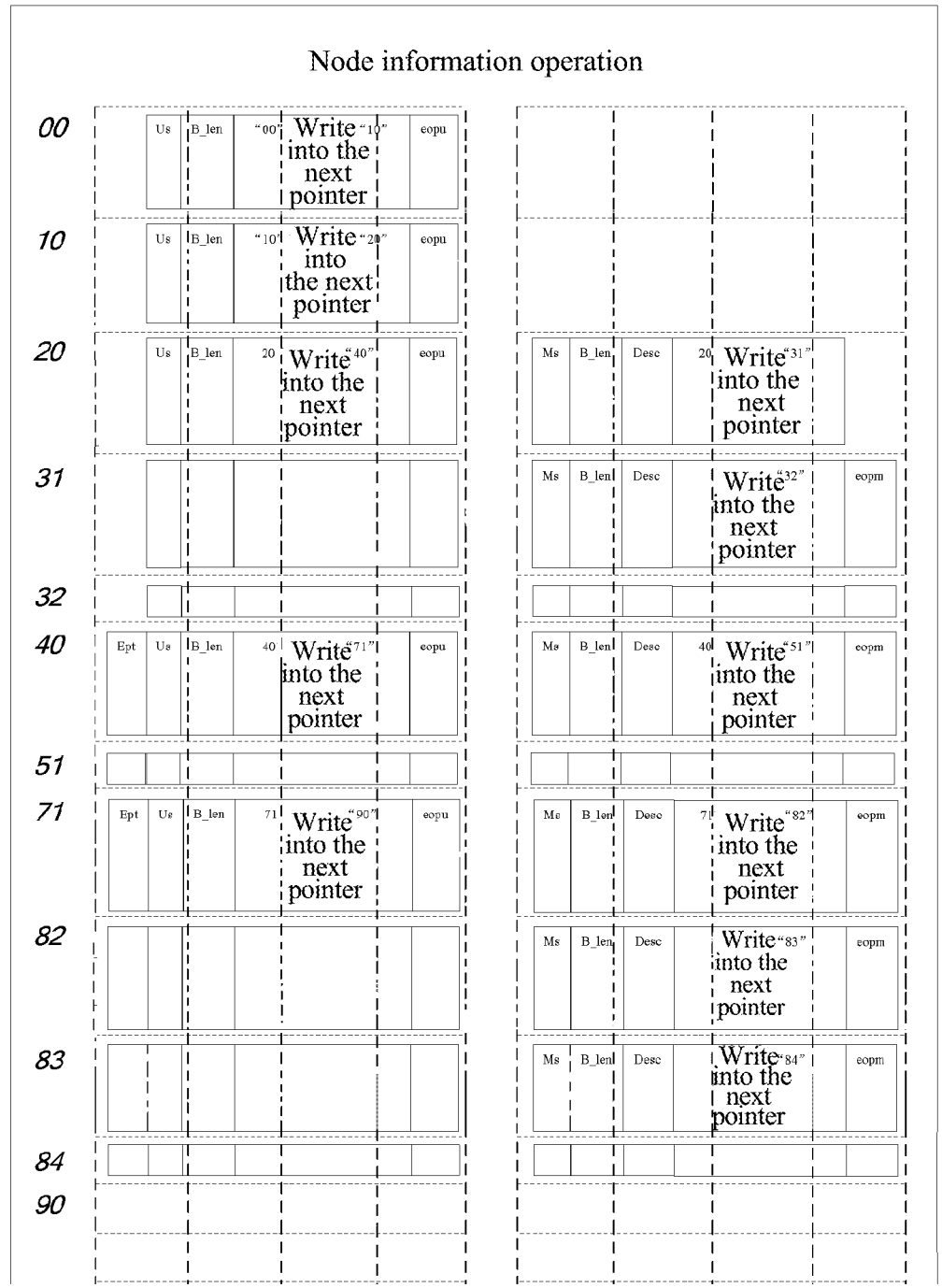
FIG. 8 is a schematic diagram of a linked list's node information operation in accordance with an embodiment of the present document.

The enqueue operation of said queue 1 is shown in FIG. 7, the linked list node operation is shown in FIG. 8, and in the initial state, the queue is empty.

Unicast node B00 enters into the queue: set the unicast packet's head pointer (HU) and unicast packet tail pointer (TU) as node index 00, set the head pointer significant tag HPOS and tail pointer significant tag TPOS as 0 to identify the current head and tail pointers as unicast bit field being valid.

Unicast node B10 enters into the queue: keep the head pointer unchanged, update the tail pointer TU to 10, and keep the pointer significant tag unchanged. Maintain the pointer of the unicast field, eopu (tail tag of the unicast packet) and the descriptor information and so on in said node memory unit.

Unicast node B20 enters into the queue: keep the head pointer unchanged, update the tail pointer (TU) to 20, and keep the pointer significant tag unchanged. Maintain the information of the unicast field in said node memory unit.

Multicast node B31 enters into the queue: keep the tail pointer field TU unchanged, still 20, update the TM (tail pointer of the multicast packet) to 31, update the tail pointer significant tag (TPOS) to 1, indicating that the current queue tail is a multicast node, while maintain the pointer and descriptor information and so on of the multicast field of said node memory unit. However, the current node is not a multicast tail, representing that a multicast packet is not over yet.

Multicast node B32 enters into the queue: update the TM to 32, keep the tail pointer significant tag TPOS still as 1, the current node is the tail node, indicating that one multicast packet is over, while maintain the pointer, eopm (tail tag of the multicast packet) and the descriptor information of the multicast field in said node memory unit.

Unicast node B40 enters into the queue: keep the tail pointer field TM unchanged, update said TU to 40, update said TPOS to still 0, it needs to maintain the information of the unicast field pointing to said multicast node B31, as shown in FIG. 7, the bit field shown in the address 20 indicates that said address needs the unicast bit field of the second operation.

Multicast node B51 enters into the queue: keep said tail pointer field TU unchanged, still 40, update said TM to 51, update the tail pointer significant tag TPOS to 1, while maintain the pointer, eopm and descriptor information of the multicast field of said node memory unit.

Multicast node B82 enters into the queue: at this time since there are two consecutive multicast packets, it needs to insert an empty node B71, update the empty tag TM to 82, keep the tail pointer significant tag TPOS as 1, maintain the pointer and descriptor information of the multicast field of said node memory unit.

Multicast node B83 enters into the queue: the previous multicast node is not the tail node, update said TM to 83, and keep the tail pointer significant tag TPOS as 1.

Multicast node B84 enters into the queue: the previous multicast node is not the tail node, update the TM to 84, keep the tail pointer significant tag TPOS as 1, the current node is the tail node, then maintain the pointers, eopm and descriptor information of the multicast field of said node memory unit.

Unicast node B90 enters into the queue: keep the tail pointer field TM unchanged, update said TU to 90, update said TPOS to still 0, it needs to maintain the information of the unicast field pointing to said multicast node B82, while maintain the pointer, eopu and descriptor information and so on of the multicast field of said node memory unit.

It is described above the unicast and multicast node aggregation operations in the case of enqueue, in the following, we will describe the dequeue process of said queue, the queue pointer operation is shown in FIG. 7, and the linked list node operation is shown in FIG. 8.

Node B00 exits the queue: keep the tail pointer field unchanged, update said HU to 10, and keep said HPOS pointer unchanged, still 0.

Node B10 exits the queue: keep the tail pointer field unchanged, update said HU to 20, keep the HPOS pointer unchanged, still 0.

Node B20 exits the queue: keep the tail pointer field unchanged, read the linked list node information, update said HU to 40, update said HM to 31, and update said HPOS pointer to 1.

Node B31 exits the queue: keep said tail pointer field unchanged, read the linked list node information, keep said HU unchanged, update said HM to 32, and keep said HPOS pointer unchanged.

Node B32 exits the queue: keep the tail pointer field unchanged, read the linked list node information, and said node is a multicast tail piece, keep said HU unchanged, keep said HM unchanged, and update said HPOS pointer to 0.

Node B40 exits the queue: read the linked list node information, update said HU to 71, update said HM to 51, and update said HPOS pointer to 1.

Node B51 exits the queue: analyze that said descriptor's ept (empty node tag) field is valid, indicating that said node is an empty node, said eopm is valid, indicating that the next node is still a multicast packet, and update said HPOS pointer to 1.

Node B82 exits the queue: read the linked list node information, update said HU to 90, update said HM to 83, update said HPOS pointer to 1, and the current node is not the packet tail.

Node B83 exits the queue: read the linked list node information, update said HU to 90, update said HM to 84, the current node is the packet tail, and update said HPOS pointer to 0.

Node B90 exits the queue: compare the current head and tail pointers, and all bit fields are identical, representing that said queue is empty. The en-queue and de-queue operations of said unicast and multicast packets in the queue is complete.

Those ordinarily skilled in the art can understand that all or some of steps of the abovementioned method may be completed by the programs instructing the relevant hardware, and said programs may be saved in a computer-readable memory medium, such as read only memory, magnetic or optical disk. Alternatively, all or part of the steps of the abovementioned embodiments may also be implemented by using one or more integrated circuits. Accordingly, each module/unit in the abovementioned embodiment may be realized in the form of hardware or software function module. The present document is not limited to any specific form of hardware and software combinations.

The above description is only preferred embodiments of the present document, and of course, the present document may also have a variety of other embodiments, without departing from the spirit and essence of the present document, those skilled in the field can make all kinds of corresponding changes and modifications in accordance with the present document and all these corresponding changes and modifications should be included within the protection scope of the appended claims of the present document.

INDUSTRIAL APPLICABILITY

In summary, the embodiment of the present document provides a message processing method and device, which does not need to use two separate management mechanisms because of the replication of multicast node, and manages and maintains the unicast and multicast attributes and the corresponding linked list pointer in a single node information, so as to ensure that the queue nodes and the cache space units can be one to one corresponding with each other, the entire management only needs to maintain one set of linked list allocation and reclaimant mechanism. In a scenario that there are unpredictable unicast and multicast messages at the system input side, use one node to separately maintain the descriptor linked list from the unicast and multicast two dimensions, so as to achieve unified memory of unicast and multicast messages, and the descriptor linked list corresponds to the packet entity cache resource, significantly reducing the overheads for managing said unicast and multicast messages and having better versatility.

What we claim is:

1. A message processing method, comprising:
    allocating a node to an input message in a cache space, saving said message, and taking a location corresponding to said cache space as index information of a descriptor of said message;
    extracting descriptor information of said message;
    framing and saving said descriptor information and node information of said message in a node linked list;
    wherein the allocating step specifically comprises:
    applying for a node in a cached idle linked list, and
    enqueuing and saving said node, if adjacent nodes in a same queue have a multicast attribute, inserting an empty node between said adjacent nodes; a multicast pointer of a previous node pointing to an address of said empty node, and the multicast pointer of said empty node pointing to next node.

2. The method of claim 1, wherein saving said message comprises:
    saving said message in an external memory unit in accordance with a cache address corresponding to said node.

3. The method of claim 2, wherein, after saving said message into said external memory unit according to said cache address corresponding to said node, further comprising:
    after receiving a dequeue command, obtaining a linked list pointer of said node according to said dequeue command, and reading data corresponding to said node according to a mapping relationship between said linked list pointer and said external memory unit.

4. The method of claim 3, wherein, said descriptor information comprises one or more of following information:
    a unicast information of said message, a multicast information of said message, an index information, a message tail attribute of the current node, an effective number of bytes, and a queue number.

5. The method of claim 2, wherein, said descriptor information comprises one or more of following information:
    a unicast information of said message, a multicast information of said message, an index information, a message tail attribute of the current node, an effective number of bytes, and a queue number.

6. The method of claim 1, wherein, said descriptor information comprises one or more of following information:
    a unicast information of said message, a multicast information of said message, an index information, a message tail attribute of the current node, an effective number of bytes, and a queue number.

7. A message processing device, comprising hardware performing instructions stored in a non-transitory computer readable medium which executes steps in following modules:
    a first module, configured to: allocate a node to an input message in a cache space, save said message, and take a location corresponding to said cache space as index information of a descriptor of said message;
    a second module, configured to: extract descriptor information of said message;
    a third module, configured to: frame and save said descriptor information and node information of said message in a node linked list;
    wherein said first module comprises a first unit configured to:
    apply for a node in a cached idle linked list and maintain a corresponding linked list pointer, and
    enqueue and save said node, if adjacent nodes in a same queue have multicast attribute, insert an empty node between said adjacent nodes; a multicast pointer of a previous node pointing to an address of said empty node, and the multicast pointer of said empty node pointing to next node.

8. The device of claim 7, wherein, said first module comprises:
    a second unit, configured to: save said message in an external memory unit according to a cache address corresponding to said node.

9. The device of claim 8, wherein, said device further comprises:
    a fourth module, configured to: after receiving a dequeue command, obtain the linked list pointer of said node according to said dequeue command, and according to a mapping relationship between said linked list pointer and said external memory unit, read the data corresponding to said node.

10. The device of claim 9, wherein, said descriptor information comprises one or more of:
    a unicast information of said message, a multicast information of said message, an index information, a message tail attribute of the current node, an effective number of bytes, and a queue number.

11. The device of claim 8, wherein, said descriptor information comprises one or more of:
    a unicast information of said message, a multicast information of said message, an index information, a message tail attribute of the current node, an effective number of bytes, and a queue number.

12. The device of claim 7, wherein, said descriptor information comprises one or more of:
    a unicast information of said message, a multicast information of said message, an index information, a message tail attribute of the current node, an effective number of bytes, and a queue number.

* * * * *